US009547876B2

(12) United States Patent
McCormick et al.

(10) Patent No.: US 9,547,876 B2
(45) Date of Patent: Jan. 17, 2017

(54) DIGITAL DATA PROCESSING SYSTEMS AND METHODS FOR SEARCHING AND COMMUNICATING VIA A SOCIAL NETWORK

(75) Inventors: Kent McCormick, San Ramon, CA (US); Bansi Shah, San Francisco, CA (US); Thomas Kilgore, Lebanon, PA (US); Shashi Upadhyay, San Francisco, CA (US)

(73) Assignee: Lattice Engines, Inc., San Mateo, CA (US)

( * ) Notice: Subject to any disclaimer, the term of this patent is extended or adjusted under 35 U.S.C. 154(b) by 803 days.

(21) Appl. No.: 13/346,371

(22) Filed: Jan. 9, 2012

(65) Prior Publication Data

US 2012/0215848 A1 Aug. 23, 2012

Related U.S. Application Data (60) Provisional application No. 61/443,679, filed on Feb. 16, 2011.

(51) Int. Cl.
*G06F 15/16* (2006.01)
*G06Q 50/00* (2012.01)
*G06Q 10/10* (2012.01)

(52) U.S. Cl.
CPC ............ *G06Q 50/01* (2013.01); *G06Q 10/10* (2013.01)

(58) Field of Classification Search
CPC  G06Q 30/02; G06Q 30/0204; G06Q 30/0241; G06Q 30/0269; G06Q 50/01; H04L 51/32
USPC ......................................... 709/201, 204–207
See application file for complete search history.

(56) References Cited

U.S. PATENT DOCUMENTS

| | | | |
|---|---|---|---|
| 6,338,138 B1 | 1/2002 | Raduchel et al. | |
| 6,980,982 B1 * | 12/2005 | Geddes, Jr. | ........ G06F 17/30867 705/27.1 |
| 7,254,641 B2 | 8/2007 | Broughton et al. | |
| 7,359,894 B1 | 4/2008 | Liebman et al. | |
| 7,568,001 B2 | 7/2009 | McPartlan et al. | |
| 7,580,862 B1 | 8/2009 | Montelo et al. | |
| 7,613,886 B2 | 11/2009 | Yamazaki | |
| 7,818,394 B1 * | 10/2010 | Lawler | .................. G06Q 10/10 709/200 |
| 7,870,012 B2 | 1/2011 | Katz et al. | |
| 7,966,369 B1 | 6/2011 | Briere et al. | |
| 8,073,867 B2 | 12/2011 | Chowdhury | |
| 8,176,490 B1 * | 5/2012 | Jackson | .................. G06F 9/468 718/100 |
| 2002/0059201 A1 | 5/2002 | Work | |
| 2002/0138316 A1 | 9/2002 | Katz et al. | |

(Continued)

OTHER PUBLICATIONS

International Search Report and Written Opinion mailed Apr. 2, 2013 for Application No. PCT/US2012/68740 (21 Pages).

(Continued)

*Primary Examiner* — Waseem Ashraf
(74) *Attorney, Agent, or Firm* — Nutter McClennen & Fish LLP; David J. Powsner; Michael P. Visconti, III (57) ABSTRACT

A method for querying the collective social network on behalf of a limited group of users is described. The method consists of a system that schedules and executes searches according to a set of search objectives specified by the users. The system searches each member's social network for a connection that matches any search objective.

27 Claims, 5 Drawing Sheets

(56) References Cited

U.S. PATENT DOCUMENTS

| | | |
|---|---|---|
| 2002/0174000 A1 | 11/2002 | Katz et al. |
| 2002/0178077 A1 | 11/2002 | Katz et al. |
| 2003/0018702 A1 | 1/2003 | Broughton et al. |
| 2003/0033179 A1 | 2/2003 | Katz et al. |
| 2003/0037263 A1 | 2/2003 | Kamat et al. |
| 2005/0283497 A1 | 12/2005 | Nurminen et al. |
| 2006/0179255 A1 | 8/2006 | Yamazaki |
| 2006/0277213 A1* | 12/2006 | Robertson .............. G06Q 10/02 |
| 2007/0162450 A1 | 7/2007 | Siress et al. |
| 2007/0208743 A1 | 9/2007 | Sainaney |
| 2008/0034354 A1 | 2/2008 | Brughton et al. |
| 2008/0072239 A1 | 3/2008 | Liang et al. |
| 2008/0222125 A1 | 9/2008 | Chowdhury |
| 2008/0312959 A1 | 12/2008 | Rose et al. |
| 2008/0320486 A1 | 12/2008 | Bose et al. |
| 2009/0144120 A1 | 6/2009 | Ramachandran |
| 2009/0164447 A1* | 6/2009 | Daya ................... G06F 21/6218 |
| 2009/0171729 A1 | 7/2009 | Anisimov et al. |
| 2009/0307205 A1* | 12/2009 | Churchill .......... G06F 17/30867 |
| 2010/0046842 A1 | 2/2010 | Conwell |
| 2010/0132044 A1 | 5/2010 | Kogan et al. |
| 2010/0174709 A1* | 7/2010 | Hansen ............... G06F 17/3087 707/728 |
| 2010/0223211 A1 | 9/2010 | Johnson et al. |
| 2010/0241652 A1 | 9/2010 | Fasihuddin et al. |
| 2010/0274859 A1 | 10/2010 | Bucuk |
| 2011/0029367 A1 | 2/2011 | Olson et al. |
| 2011/0029430 A1 | 2/2011 | Norris et al. |
| 2011/0161319 A1* | 6/2011 | Chunilal ........... G06F 17/30867 707/733 |
| 2011/0289153 A1 | 11/2011 | Hull et al. |
| 2012/0005224 A1* | 1/2012 | Ahrens ................. G06Q 10/10 707/769 |
| 2012/0185472 A1* | 7/2012 | Ahmed ............. G06F 17/30867 707/728 |

OTHER PUBLICATIONS

International Search Report and Written Opinion for Application No. PCT/US2012/20657 mailed May 3, 2012.

* cited by examiner

DIGITAL DATA PROCESSING SYSTEMS AND METHODS FOR SEARCHING AND COMMUNICATING VIA A SOCIAL NETWORK

REFERENCE TO RELATED APPLICATIONS

This application claims the benefit of filing of U.S. Provisional Patent Application No. 61/443,679, filed Feb. 16, 2011, entitled "Digital Data Processing Systems and Methods for Searching and Communicating via a Social Network," the teachings of which are incorporated by reference herein.

BACKGROUND OF THE INVENTION

The present invention relates to digital data processing systems and methods and, more particularly, to systems and methods for searching and facilitating communications via online social networks. It has application, by way of non-limited example, in searching such networks (a/k/a "social networking sites") on behalf of a group of users.

Social networks have emerged as a powerful tool for enabling their members to access (including, search) and/or exchange information about one another, about topics of interest, and so forth. One appeal is that the systems allow members to establish links (or friendships, etc.) of varying degrees of closeness or "connectedness" that determine how much information one member may access about another, as well as how directly they may communicate using network messaging, email and other network tools.

For example, an online social networking service may enable some members to message each other directly and/or to view one another's postings (e.g., photographs, resumes, etc). This is typically limited to members that are connected to the "first" degree—e.g., members who have explicitly authorized this type of contact.

Such a online social networking service, on the other hand, may greatly restrict contacts and access between members who have not provided such authorization, e.g., preventing members who are, for all intents and purposes, strangers (at least so far as the online service can discern) from communicating or accessing any information about one another, except perhaps names, brief biographies or other information explicitly designated as public.

Somewhere in between is the typical online social network's treatment of communications between members who, though not directly connected at the first degree, are indirectly connected via one or more intermediary members—such as in the case of "friend's friends" (i.e., members connected to the "second" degree), "friend's friend's friends" (i.e., "third" degree), and so forth. Typically, a networking service will permit limited access/communications between members so situated, depending on the degree of indirection, and/or will facilitate formal electronic introductions (e.g., via email) through the intermediary(ies) so that the indirectly connected members can formally authorize (or block) a direct connection with one another.

In connection with rules governing interactions among members based on connectedness, the most successful networks have implemented privacy controls to ensure that member information and networks are protected. These include user-adjustable settings governing what of their information and postings are private, semi-private, public, and so forth. These also include rules governing how third party software applications may interface with the online social networks—for example, what data they can retain between user sessions, and so forth.

Traditionally, online social networking services have provided dedicated web sites by which members access the network and services, e.g., permitting members to post information and to message one another, as well as to use the service's administrative tools, e.g., for member sign-up, privacy setting adjustments, and so forth. In addition, many online networks provide public application programming interfaces (APIs) that allow third-party software systems (e.g., stand-alone applications, mobile apps, etc.) to provide such access and services to members in lieu of, or in addition to, the web sites.

Among the most popular of those tools provided by online social networks (whether executed via web interface or other applications) is the query. This permits members to search for other members based on name, current or former company affiliation, and/or other criteria. Thus, for example, a member who is interested in gaining insight into a potential corporate customer might use a query to find out who in his or her "network"—i.e., which of his/her friends and/or of their respective friends, etc.—work for that corporation.

Typically, online social networks limit application of those queries to member records (and other member information) that the querying member might otherwise see in accord with the connectedness and/or privacy constraints discussed above. Hence, for example, a query by one member on company affiliation might reveal names of other members that work for that organization and that are connected to the querying member at the first or second degree, but not members who are connected (if at all) at higher degrees.

As is particularly germane to queries executed by separate, third-party software systems, many of these queries can only be executed under the credentials of a particular member to ensure that the privacy considerations of the members are respected. In addition, user applications, mobile apps and other software systems using APIs of a online social network are typically prohibited from storing information from the social network as this may conflict with the privacy terms of the network.

While a boon to individuals and businesses alike, online social networks are not without shortcomings. There are many cases where members of an online social network may share a common interest (e.g., they may be part of a sales organization seeking to develop contacts for the organization) but where collectively leveraging their social network connections is not feasible.

For example, as discussed above, typical online social networks limit the depth of query responses in accord with the network's connectedness and/or privacy constraints. Thus, for a network that limits members to search only to second degree connections, a member can search through the links of his/her friends, but not through the links of his/her friend's friends. Thus, even if the members of a group (again, for example, the sales organization) are linked via a social network, they cannot search each other's second level connections within that network because those searches would extend to third level connections and, as such, would violate the network's privacy rules.

An object of the invention is to provide improved systems and methods for digital data processing.

A further object is to provide such systems and methods as facilitate use and/or searching of online social networks.

Still another object is to provide such systems and methods as facilitate communications within online social networks.

Yet still other objects are to provide such systems and methods that facilitate the use of online social networks among members having a common interest.

SUMMARY OF THE INVENTION

The above objects are among those attained by the invention which provides, in some aspects, systems and methods that conduct searches and facilitate establishing communications (e.g., making links or connections) within a social network for a member of a group (e.g., a member of a sales organization) utilizing connections into that network by other members of that group. Such systems and methods advantageously permit members of an enterprise, club, or other group to leverage each other's respective connections in a social network, thereby, facilitating searches for and communications with larger numbers of prospective contacts (e.g., searches among "friend's friends," "friend's friend's, friends," so forth).

Aspects of the invention provide a digital data processing system for searching and/or for establishing communications on an online social network. The system comprises an online social networking site (such as, by way of non-limiting example, LinkedIn, Facebook, etc.) that includes a plurality of members and that supports searching for and/or communicating with members based on degrees of connectedness vis-a-vis the online social networking site, and that further includes an interface (e.g., an "API") providing such searching and communicating in response to automated requests on behalf of members.

For sake of simplicity and without loss of generality, the terms "social network," "social networking site," "online social network," and the like, are used interchangeably herein to reference to online social networks. Similarly, as those skilled in the art will appreciate, connections are common to many social networks, though, the terminology they use to describe them varies. Thus, for example, connections on one social network may be referred to as "links" on another and "friends" on still another. The terms "ties" and "edges" are also commonly used in this regard.

The system further includes collective search functionality that responds to a request from a first member of a group who is, optionally, also a member of the online social network, by applying to the interface on behalf of a second member of the group and of the online social network an automated request to any of (i) search for one or more third members of the online social network and/or (ii) to establish communications between the first member and one or more third members, where the degree of connectedness between the second and third members and between the first and third members is such that such search and/or communications would not be supported by the online social networking site absent a request on behalf of the second member.

According to related aspects, the invention provides a system, e.g., as described above, wherein the collective search functionality searches for the one or more third members by name, current or former company affiliation, and/or other criteria.

According to further related aspects, the invention provides a system, e.g., as described above, wherein the collective search functionality respects the privacy settings of the online social networking site.

According to other related aspects, the invention provides a system, e.g., as described above, wherein the first and third members are connected, if at all, by higher degrees of connectedness (vis-a-vis the online social networking site) than are first and second members.

According to other related aspects, the invention provides a system, e.g., as described above, wherein the first and third members are connected by second or higher degrees vis-a-vis the online social network and, for example, wherein the first and second members are connected at a first degree.

According to still other related aspects, the invention provides a system, e.g., as described above, wherein said first degree connection is a direct connection and said second or higher degree connection is an indirect connection.

According to related aspects, the invention provides a system, e.g., as described above, wherein the collective search functionality responds to requests from one or more first members by applying to the interface on behalf of one or more second members one or more respective automated requests to any of (i) search for one or more third members and (ii) to establish communications between respective ones of the first members and respective ones of the third members, where said degrees of connectedness between the respective second and third members and between the respective first and third members is such that such search and/or communications would not be supported by the online social networking site absent respective requests on behalf of the respective second members.

According to other related aspects, the invention provides a system, e.g., as described above, wherein the first and second members form a common group, e.g., an enterprise, club, etc.

According to related aspects, the invention provides a system, e.g., as described above, wherein the members of that common group are members of the online social network.

According to related aspects, the invention provides a system, e.g., as described above, wherein the respective first and third members are connected by second or higher degrees vis-à-vis the online social network.

According to related aspects, the invention provides a system, e.g., as described above, wherein the collective search functionality aggregates, prioritizes, and schedules any of search and communication requests by members of the common group.

According to related aspects, the invention provides a system, e.g., as described above, wherein the collective search functionality generates a search queue that defines the order in which any of search and communication requests are applied to the interface on behalf of the common group.

According to still other related aspects, the invention provides a system, e.g., as described above, wherein the collective search functionality generates the search queue that defines the order such that group member networks are individually searched so as to equally distribute search requests among group members.

The invention provides, in yet other aspects, a digital data processing system, e.g., as described above, that includes a store comprising one or more search objectives for use in applying on searching the online social network for members. These can be, for example, names, company affiliations and/or other criteria of members of interest. Thus, the collective search functionality can respond to each such search objective by or on behalf of a first member by applying to the interface on behalf of a second member an automated request to search for one or more third members meeting the specified criteria.

In other related aspects, the invention provides a system, e.g., as described above, wherein the store maintains search objectives for a plurality of first members.

According to related aspects, the invention provides a system, e.g., as described above, wherein the first and second members form a common group for whom the store maintains a plurality of search objectives. Continuing the example above, the group can be, for example, part of a sales organization seeking to develop new clients for their firm.

According to related aspects, the invention provides a system, e.g., as described above, wherein the search objectives are generated from a customer relationship management system.

According to further aspects, the invention provides a system, e.g., as described above, wherein the search objectives are entered by one or more first members and/or by others.

According to related aspects, the invention provides a system, e.g., as described above, wherein the collective search functionality applies search requests to the interface in an ordered fashion, e.g., so as to effect a prioritization of the searches. These may be specified by one or more first and/or second members and/or by others.

Still other aspects of the invention provide methods corresponding to the operations described above.

These and other aspects of the invention are evident in the drawings and in the text below.

DETAILED DESCRIPTION OF THE ILLUSTRATED EMBODIMENT

Online social networks have developed on the basis of maximizing the interest of individual users, who are typically provided the exclusive ability to define their respective connections to other users. In many cases the user can control a connection's ability to view his or her information or communicate with the user.

Social networks ensure privacy by limiting search capabilities and preventing a user from seeing the network through anyone else's perspective. This applies to the search functionality, which typically only permits viewing the network from a single user's perspective. In order to protect privacy and the reproduction of a social graph, online social network providers often prevent application developers from caching any data they receive. Therefore, the current setup of social networks severely limits the ability of a group to collectively leverage one another's connections in order to assist one another and achieve common goals.

Provided herein are systems and methods overcoming those limitation by facilitating the search of contacts (and the establishing of communications) to assist in achieving individual and common goals—particularly, by enabling a group of individuals to collectively search the combined network of the group, to establish communications between members of the group and individuals (or entities) in the resultant "collective network," and/or to equitably balance the load of searches across members of group.

A fuller appreciation of the invention may be attained by reference to the discussion of its embodiments below and to the accompanying drawings. Those embodiments may be used in any variety of applications, though, for sake of simplicity and without loss of generality, in one exemplary embodiment, users of the systems and methods disclosed herein are sales representative dedicated to selling a product offering. Each user has individual goals of selling the products to his or her particular account and a common goal of increasing sales of the product generally.

In order to achieve individual goals and contribute to the common goal, users can leverage the collective social network established by systems and methods herein, i.e., the collective social network made by the union of each individual's social network. Thus, in the exemplary embodiment, a sales representative can search out someone in the social network that is connected to a fellow representative and, for example, on the basis of that connection, automatically request an introduction and/or engage in substantive communications in the name of that fellow member.

As discussed below, in the illustrated embodiments, systems and methods according to the invention effect the collective social network through operation of a software application (simply referred to below as "the software application") constructed and operated in accord with the teachings hereof that (i) layers on top of a conventional online social network of the type known in the art and (ii) interfaces with the online network via its API or otherwise. Users are granted access to and provided verification credentials for the software application by an application administrator. All users of the software application may be treated as a single group or they may be further sub-grouped based on, e.g., a common goal. The software application utilizes the online social network to access the structure and elements of the social graph.

In the illustrated embodiment discussed below, the users are all members of the online social network and, moreover, are connected to one another at a first degree within that network. In other embodiments, the users may be connected at higher degrees within the network and, indeed, in still other embodiments, some users are not be members of the network at all.

Figure 5:
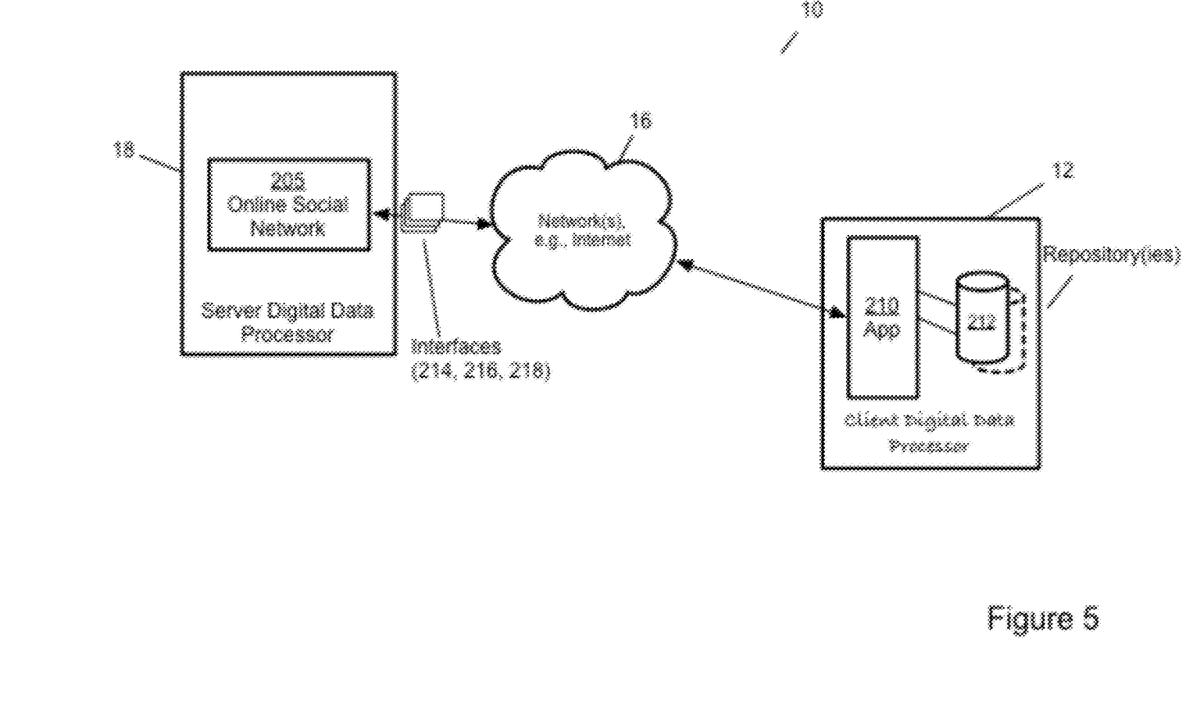
FIG. 5 depicts an architecture of an exemplary embodiment of a system according to one practice of the invention for searching and facilitating communications via online social networks.

FIG. 5 depicts digital data processing system 10 for searching and facilitating communications via an online social network according to one practice of the invention. The illustrated system includes a client digital data processor 12 that is coupled via network 16 for communication with server digital data processor 18.

The client digital data processor 12 is a conventional desktop computer, workstation, minicomputer, laptop computer, tablet computer, PDA or other digital data processing apparatus of the type that is commercially available in the marketplace and that is suitable for operation in the illustrated system as described herein, all as adapted in accord with the teachings hereof.

The server digital data processor 18 is, likewise, a digital data processing apparatus of the type commercially available in the marketplace suitable for operation in the illustrated system as described herein. Though the server 18 is typically implemented in a server-class computer, it may also be implemented in a desktop computer, workstation, laptop computer, tablet computer, PDA or other suitable apparatus.

Network 16 comprises one or more networks suitable for supporting communications among and between illustrated digital data processors 12, 18. Illustrated network 16 comprises one or more public networks, specifically, the Internet, though, in other embodiments, it may include (instead or in addition) one or more other networks of the type known in the art, e.g., local area networks (LANs), wide area networks (WANs), metropolitan area networks (MANs), and or Internet(s).

Illustrated client computer 12 comprises central processing, memory, storage and input/output units and other constituent components (not shown) of the type conventional in the art that are configured to form software application 210 and one or more repositories 212. One or more of these constituent components, and/or portions thereof, may be absent in various embodiments of the invention and/or they may be combined with one another and/or integrated with still other components.

The central processing, memory, storage and input/output units of client digital data processor 12 may be configured to form and/or may be supplemented by other elements of the type known in the art desirable or necessary to support elements 210, 212 in accord with the teachings hereof, as well as to support other operations of the digital data processor 12. These can include, by way of non-limiting example, peripheral devices (such as keyboards and monitors), operating systems, database management systems, and network interface cards and software, e.g., for supporting communications between digital data processor 12 and other devices over network 16.

Repositories 212 comprise data stores of the type known in the art (albeit configured in accord with the teachings hereof) for storing corporate, personal, governmental and/or other data that may be any of generated, stored, retrieved and otherwise processed by application 210. The data may be contained in tables, database records, database objects, and so forth.

Server digital data processor 18 comprises central processing, memory, storage and input/output units and other constituent components (not shown) of the type conventional in the art that are configured in accord therewith to form and support operation of an online social network 205 of the conventional type known in the art. This includes interfaces 214, 216, 218 supporting web access, access via dedicated applications, and access via a pubic applications program interface (API), as per convention in the art. The social network 205 can be any of a variety of popular social networks (e.g., Facebook, LinkedIn, etc.), or otherwise.

Although only a single client data processor 12 is depicted and described here, it will be appreciated that other embodiments may have greater numbers of these devices disposed near and/or far from one another, collocated behind one or more common firewalls or otherwise. Those other client devices may differ in architecture and operation from that shown and described here and/or from each other, all consistent with the teachings hereof. Moreover, those client devices may share in operation of a common software application 210 and/or repositories 212. Alternatively, or in addition, they may operate and/or have their own respective such application 210 and/or repositories 212 that operate independently, in coordination, or otherwise with respect to one another.

Likewise, although only a single server digital data processor 18 operating a single social network 205 is depicted and described here, it will be appreciated that other embodiments may have greater numbers of these devices and/or may operate greater numbers of online social networks, which may be employed in parallel, in seriatim or otherwise consistent with the teachings hereof.

Moreover, although provided as separate elements in the illustrated embodiment, in other embodiments, the software application 210 can be integrated into software defining the social network 205, or vice versa.

Figure 1:
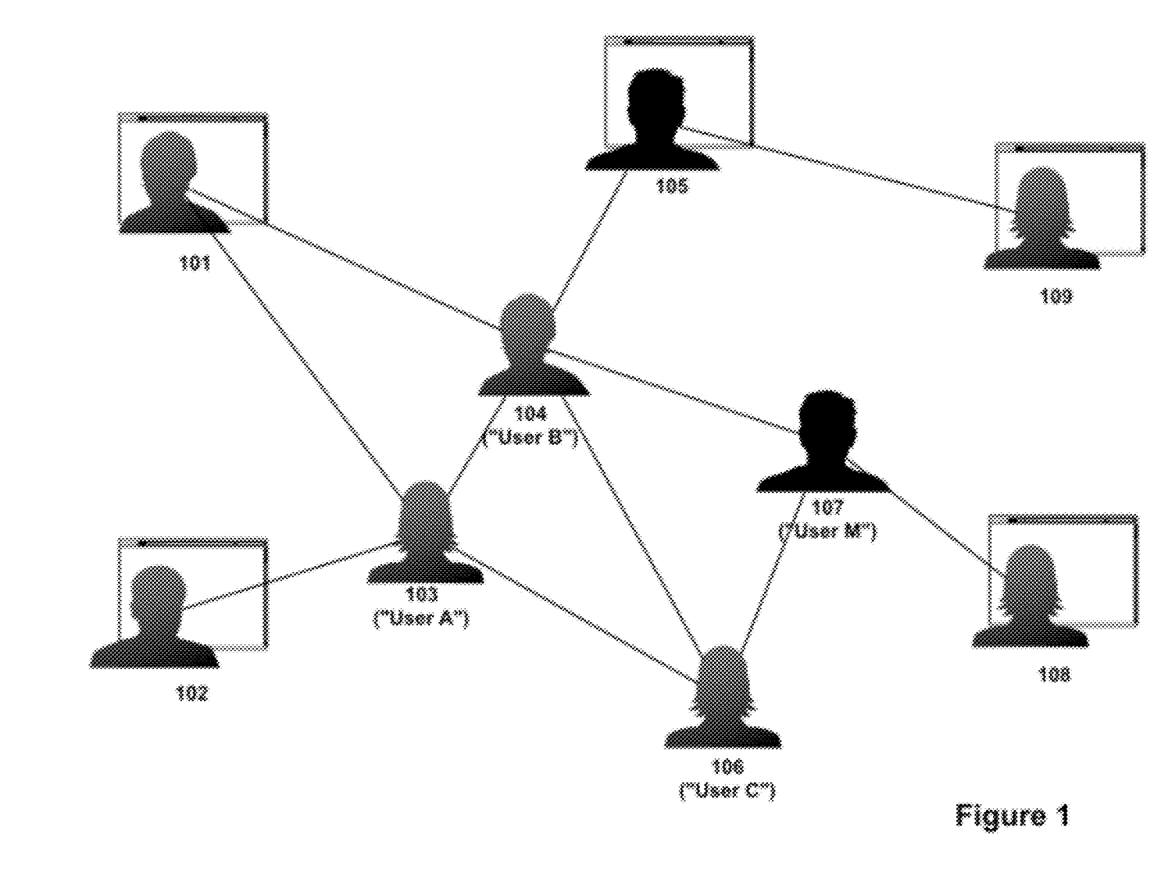
FIG. 1 depicts an exemplary embodiment of a system according to one practice of the invention for searching and facilitating communications via an online social network.

FIG. 1 illustrates connections between individual and/or entities in an online social network 205 of the type with which systems and methods of the invention may be practiced and in a collective social network formed through use of those systems and methods.

Referring to the drawing, there are shown elements 101-109, each representing an individual or entity (collectively, elsewhere herein, except as otherwise evident from context, "individuals") that are members of an online social network 205, and that are linked to one another to various degrees thereby. Thus, for example, member 105 is linked by a first-degree connection to member 104; member 109 is linked by a second-degree connection to member 104, by virtue of his/her common connection with member 105; and, member 109 represents a third-degree connection of member 106—all by way of non-limiting example.

Like other conventional online social networks, social network 205 of the illustrated embodiment limits how much information (if any) each individual 101-109 may access about another, as well as whether and how they may communicate via the online network 205 (e.g., its messaging, email, etc., features) based on that connectivity. Thus, for example, social network 205 would preclude individual 106 from searching or communicating with individual 109, because they are separated by more than one or two degrees.

The software application 210 overcomes this by providing for a limited group of individuals—here, represented by members 103 (a/k/a "User A"), 104 ("User B"), 106 ("User C"), and 107 ("User M"), who may be, for example, fellow sales representatives of a company—collective search functionality and, more generally, for whom it effects a collective social network, thereby, permitting members of the limited group to leverage each other's respective connections in the online social network 205, thereby, facilitating searches for and communications with larger numbers of prospective contacts (e.g., searches among "friend's friends," "friend's friend's, friends," so forth). Although the software application 210 discussed here supports such searching (and communication) for individuals, other embodiments support such activities for other entities (e.g., corporations, etc.).

That collective network is a union of each member of the limited group (e.g., the sales reps) and his or her connections at a second degree. Thus, in the illustrated embodiment, the collective social network includes the members of the limited group, the direct or first-degree connections of each of the members of the limited group of users, and the direct or first-degree connections of each of the connections of the members of the limited group of users. Of course, this is by way of an example that assumes the social network 205 limits access (including search) beyond more than one degree. If that network imposed such a limit beyond the second degree, the collective social network effected by the software application 210 would include the members of the limited group, the first- and second-degree connections of each of the members of the limited group of users, and the first- and second-degree connections of each of the connections of the members of the limited group of users. And so forth.

Figure 2:
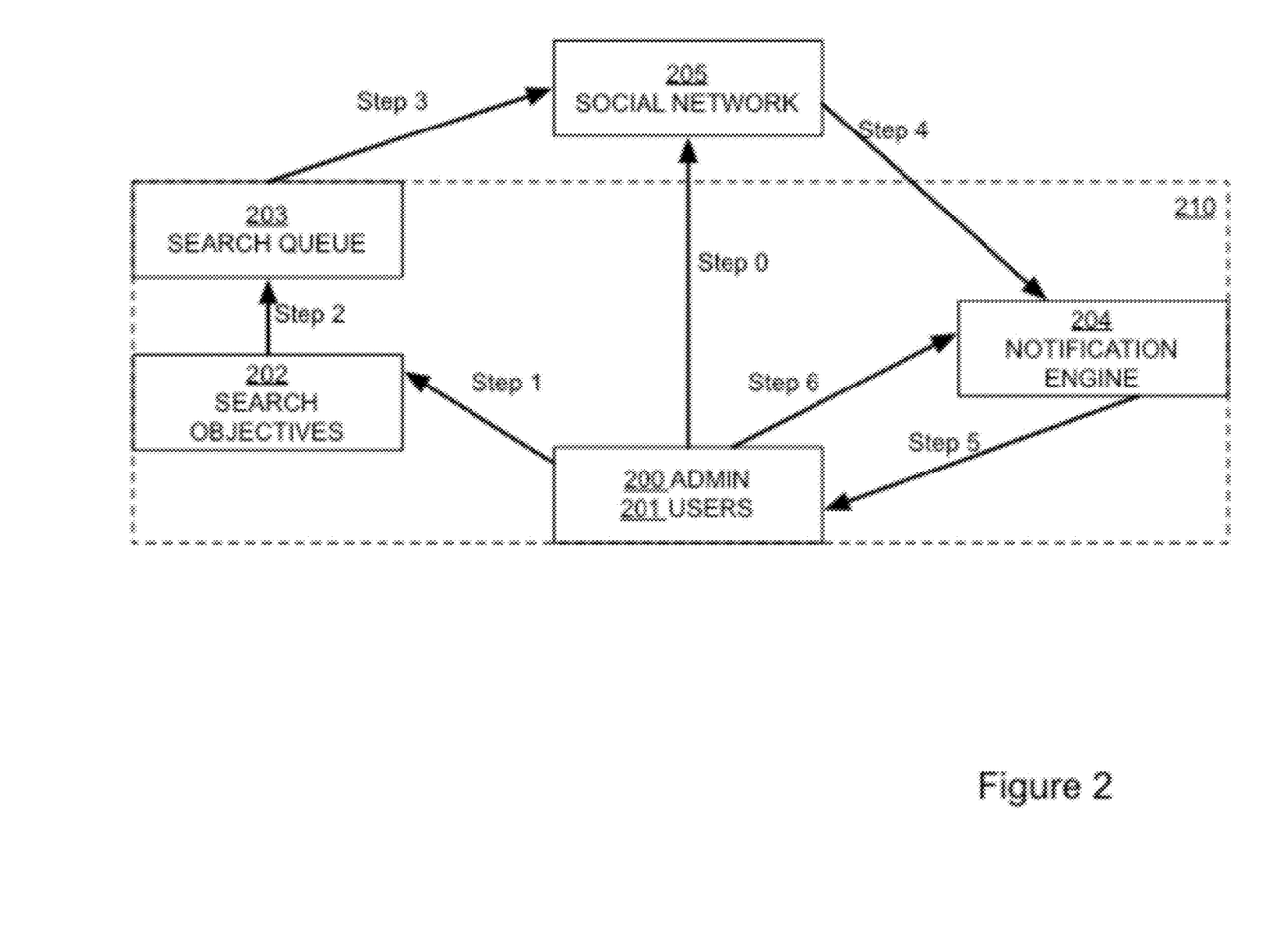
FIG. 2 depicts a software application that interfaces with an online social network in a system according to the invention.

FIG. 2 depicts in further detail software application 210, as well as the relationship between that application and online network 205, in a system according to the invention. As noted above, although provided as separate elements in the illustrated embodiment, in other embodiments the software application 210 can be integrated into software defining the social network 205, or vice versa.

Illustrated software application 210, includes administrator repository 200, user repository 201, search objective repository 202, search queue 203, and notification engine 204, all interconnected for communications as indicated in the drawing—some or all of which are referred to above, generally, as repository 212.

Repositories 200, 201 reflect credentials of administrators and users, respectively, vis-a-software application 210 and social network 205. This can include login credentials, access privileges, email/SMS contact information, and so forth. These and the other illustrated repositories and queues may be implemented as databases, tables, linked lists, and so forth, of the type known in the art, as adapted in accord with the teachings hereof.

In the illustrated embodiment, the software application 210 communicates with the social network via an API provided by the social network 205. Alternatively, or in addition, it can effect such communications using the same interface as a human user would, e.g., an HTML interface (e.g., by parsing web page content and simulating user inputs such as browser navigations, mouse clicks, or keyboard strokes).

The software application 210 defines and maintains repository 201 as a dynamic repository of the limited group of individuals—here, represented by members 103, 104, 106, and 107—for whom it effects a collective social network. In the illustrated embodiment, each member of the limited group of users is a member of both the social network 205 and the software application, although, other embodiments may vary in this regard.

Membership in the limited group (as defined by the repository), as well as access privileges, may be defined by the users themselves and/or by administrators. In the illustrated embodiment, a user may become a member of the limited group of users or withdraw their membership at anytime during the execution of the software application.

Thus, for example, an administrator may define users of the application while those those users, themselves, may enter social network login credentials (such as usernames and passwords) and other information. In the illustrated embodiment, the software application supplies those credentials to the social network 205 on behalf of the users via a communication protocol between the social network 205 and the software application at step 0.

The software application 210 also defines and maintains repository 200 of administrators. This repository can be dynamic, as well (i.e., like repository 201), though it is expected to change less frequently than the repository of users.

Repository 202 maintains a dynamic list of search objectives for the software application 210. In the illustrated embodiment, those search objectives comprise names, titles, and/or other attributes of individuals of potential interest within the social network 205. Continuing the example above, the search objectives can comprise a combination of company names and job titles intended to ferret out members of the social network 205 that have connections to any of the members of the limited group (i.e., users of the software application) and, again, (consistent with the example) that are potential customers for a product marketed by the limited group.

The users or administrators can define and maintain the dynamic repository of search objectives 202, as reflected by step 1. The users or an administrator can also define additional search constraints at step 1, such as, to continue the example, limiting search results to those who have been employed by the account for more than six months. In preferred embodiments, the users maintain individual lists of objectives in respective areas of the repository and the software application 210 maintains a collective list, or queue, aggregated therefrom. In addition to being entered by users and/or administrators, search objectives can be generated by, or imported from, any of a variety of commercially available customer relationship management systems.

Search queue 203 defines the order in which a search of the online social network 205 will be executed on behalf of the collective members of the limited group. In step 2, the software application loads that queue, based on the objectives defined in step 1. The queue, which can be loaded on FIFO, LIFO or other bases, is preferably loaded so as to aggregate (e.g., for efficiency of search), prioritize, and schedule the objectives so that they can be applied to search functionality—e.g., via the API (or otherwise)—of the social network 205 in a manner best suited to the membership of the limited group, searching constraints of the social network 205, and so forth.

Thus, by way of example, in step 2, the software application 210 can combine, into search objective, multiple such objectives from repository 200 that are targeted to a same person, same company, etc. And, by way of further example, the applications software 210 can prioritize objectives so that search-related resources of the software 210, the client digital data processor 12 and the online social network are allocated equally (or on some other basis) to each member of the limited group. And, by way of still further example, the applications software 210 can group or otherwise schedule the requests so as to take advantage of any time-based or other constraints of those resources (e.g., vis-a-vis maximum numbers of searches per day or other period).

In step 3, the software 210 applies those queued objectives to the social network. As noted, this can be via the network API or otherwise.

In step 4, the software 210 accepts search results returned by the network. Again, this is via the network API or otherwise.

In step 5, the software application 210 notifies users via a notification engine 204 at step 5 of results of the search of their "collective" network. The results can be sent to all users or can be limited to those users whose objectives are reflected in the results. In the notifications, which can can be via email or other form of messaging, results can be prioritized for presentation to the requesting user based on a number of criteria: for example, geographical distance, number of intervening members in the link, privacy settings, among others.

An exchange between the notification engine 204 and users 201 at steps 5 and 6 determines if the search result fulfills an element in the search objective repository 202. If it does, the specific search objective can be removed from the repository 202. If it does not, the objective will remain in the repository 202 and be fed to the queue 203 to be executed again when the collective social network of the users is changed (as members are added to the limited group, as the social network grows, and/or the connections of those members into the social network itself evolve).

Figure 3:
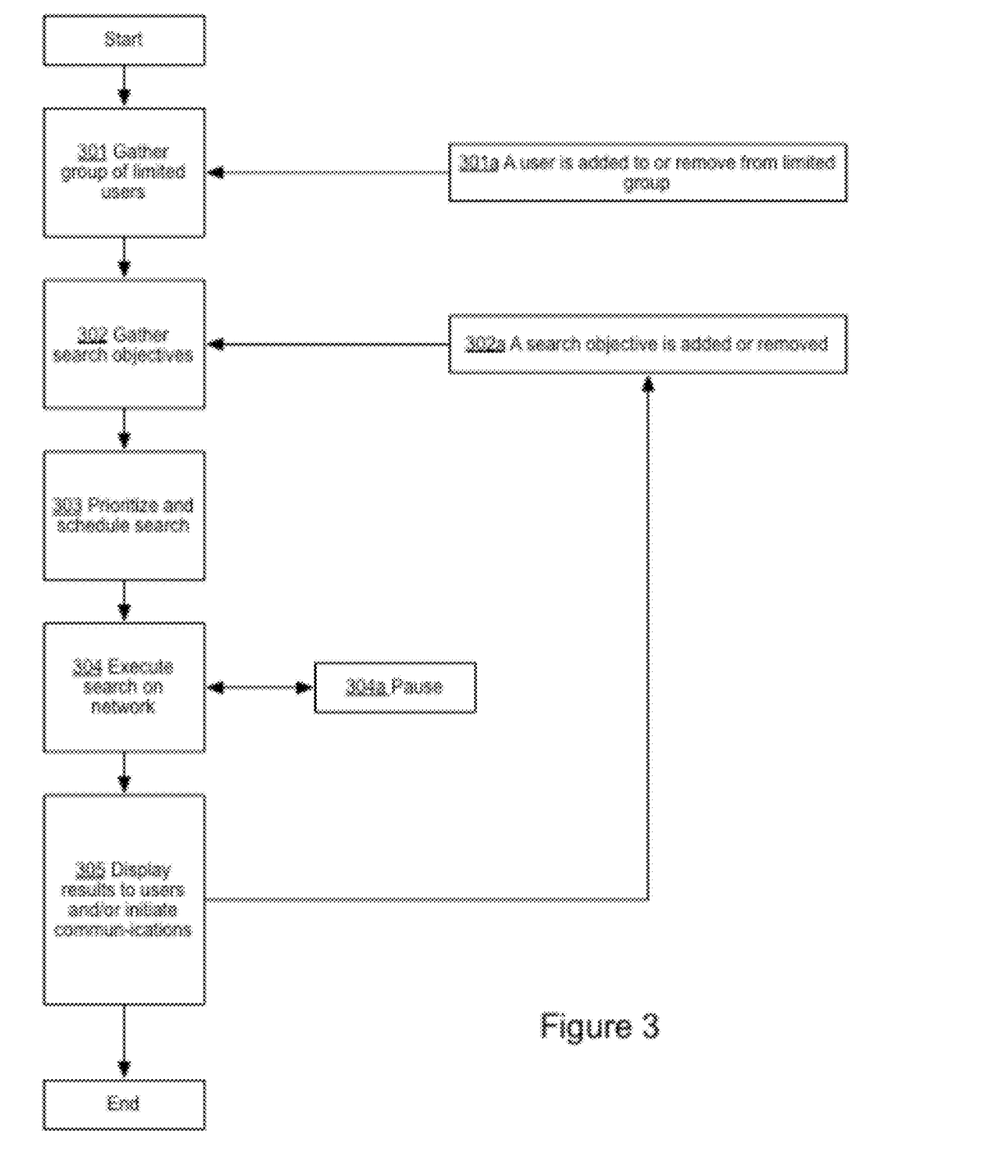
FIG. 3 is a flow chart illustrating the effect of triggers that, in one exemplary embodiment, can cause application of the search objectives to the network 205 to be reevaluated, refreshed, or re-executed.

FIG. 3 is a flow chart depicting in greater detail operation of the software application 210 according to one practice of the invention and diagramming triggers that can cause application of the search objectives to the network 205 to be reevaluated, refreshed, or re-executed.

As shown in step 301, when the software application is started it gathers information regarding an original group of users from repository 201. Referring to step 301a, if during the run of the application the limited group changes, e.g., because a new user is added or a current user is removed, operation of the software application is paused and action is restarted from 301.

Next, in step 302, the software application gathers the search objectives. Search objectives can be provided by one or more users that belong to the limited group of users (as well, as noted above, by an administrator), and can specify search targets by name, current or former company affiliation, and/or any other criteria by which users of social networking sites or tools can be searched. (Indeed, in some embodiments, criterion above and beyond those permitted by search tools on the social networking site may be provide; these additional criteria can be applied by the software application 210 as a second-order filter on results provided by those tools).

If during the run of the application the search objectives change 302a, e.g., because a search objective is added or removed, operation of the application is restarted from 302. As noted elsewhere, such objectives can be added, for example, as users (or administrators) utilize the application 210 to update the repository 202. Objectives can likewise be removed, for example, by the users (or administrators). Additionally, in some embodiments they can be retired once satisfied by search—e.g., a search objective intended to identify the purchasing director of a target company can be retired by the application and, thus, removed from the repository 202, once a corresponding search of the online social network has returned a designated number of records meeting those criteria). They can also be retired, for example, if the objective includes an explicit expiration date and/or if it goes unsatisfied after a designated number of searches and/or a designated period—all by way of example.

In step 303, the software application prioritizes and schedules the search objectives into a search queue 203, as more fully described below in connection with FIG. 4.

Referring to step 304, objectives in the search queue are individually applied by the software application to the online social network 205 (view its API or otherwise) for execution by it. Depending on details of the interface, this can include a first call by the applications program to the social network for purposes of logging-in the applicable user(s), followed by a separate call to apply the search. Alternatively, or in addition, the social network may permit the login and search to be performed in a single step (e.g., as in the case of an API call to the search tool that includes, as parameters, a user name and password for the member under whose credentials the search is being made).

If the social network refuses application of a search, e.g., because a daily, hourly or other time-wise quotas, or the like have been exceeded, execution is paused; see step 304a. The pause can be terminated and the search retried when the applicable interval restarts.

In step 305, results from search objectives already executed are displayed to the requesting users of the limited group and the rest are queued to be restarted once any applicable time interval passes. As noted one or more objectives may be retired in connection with this, as well of course as further objectives being added. In addition to displaying results to users, the application can compile a log of results for review by administrators and others, by way of example.

In addition to displaying search results, which in many cases may suffice in alerting a requesting user to the existence of members found in the social network meeting the requestor's objectives, in some embodiments, the applications program 210 can initiate, maintain, record, and/or monitor communications between the requesting user and the found member, again, taking advantage of the collective social network of the limited group of users.

For example, the application 210 can notify those colleagues within the limited group who are sufficiently closely linked in the social network to the found member of the need to make an introduction (or to otherwise assist in establishing communications) between that member and the requestor. In some embodiments, the degree of assistance provided by those colleagues in introducing or otherwise connecting requesting users to search results can be monitored and can be used to rank future search requests made by the assisting colleagues. In this manner, the software application can provide an incentive for users to facilitate communication between their peers and their various social network connections. This information can be used to display a degree of participation to the limited group of users, to the public, or to some other audience, which can further promote participation by the group.

Indeed, in online social networks 205 that so permit, the applications program 210 can utilize the API (or other interface) to make such an introduction directly in the name of the more closely-connected colleague. Such an introduction, which can be via email or other messaging supported by the social network, can be for purposes of establishing a direct connection between the introduced parties (i.e., the requestor and the found member) via the social network, or otherwise.

Alternatively, or in addition, the applications software 210 can utilize the API (or other interface) to support substantive communications (e.g., as opposed to a mere introduction) between the requestor and the found member. Continuing the example above, such a substantive communication automatically generated by the program 210 might consist of an in-network message (initiated by the application software 210 via the API) in the name of the more closely-connected colleague to the found member to the effect of the following, or the like:

"Dear [Found Member]: I am writing on behalf of my colleague, [Requestor], who is in charge of widget sales for our company and who wishes to know whether [Found Member's Company] wishes to purchase same in connection with our year-end sale. If so, please use the attached order form. Signed [More Closely-Linked Colleague].

In related embodiments, the applications software 210 can afford the more closely-linked colleague in whose name communications were established to remain privy to conversations between requestor and the found member, for example by automatically copying that colleague in on such communications. As well, the applications software 210 can maintain a record of those communications to a repository, organized based on any of a variety of criteria, and monitored by a system administrator, compliance officer, and/or by other members of the limited group of users.

Where possible, the process shown in FIG. 3 and described above is performed periodically, e.g., hourly, daily, and so forth, and/or upon occurrence of a triggering event, e.g., admission of a new user into the limited group, entry by a user (or administrator) of a new search objective, changes in the social network 205, and so forth.

Some social networks 205 will not support multiple simultaneous member logins during a single invocation of the API (or other interface). For these, it may be necessary for the software application 210 to repeat the steps described above for each member of the limited group who is also a member of the social network—or, put another way, to conduct a collective search over all users of the application by repeating those steps for each known login, aggregating the results if those searches for presentation to the users, e.g., following completion of the last iteration.

In addition to searching a single social network 205 as described above (e.g., via a single login or multiple iterative logins), the application 210 can, in some embodiments, search multiple online social networks. This can be done, e.g., by repeating the process described above for a first such network, then, for a second such network, and so forth. Alternatively, the software application execute the sequence shown in FIG. 3 once (for example), applying searches to multiple such networks by repeated action of step 304 during that single pass.

It will be appreciated that the specifics of applying search objectives to one or more online social networks on behalf of one or more users of the limited group may vary, typically, in accord with the specifics of the online social network interfaces—and, hence, that the flow charted in FIG. 3 and described above is merely by way of example and that variations thereon within the scope of the teachings hereof may be necessary in actual practice.

Regardless, the software application can thus search one or more social networks 205 on behalf of the limited group of users represented in repository 201 and, thereby, can perform a collective search on all of their behalf in those network(s).

Figure 4:
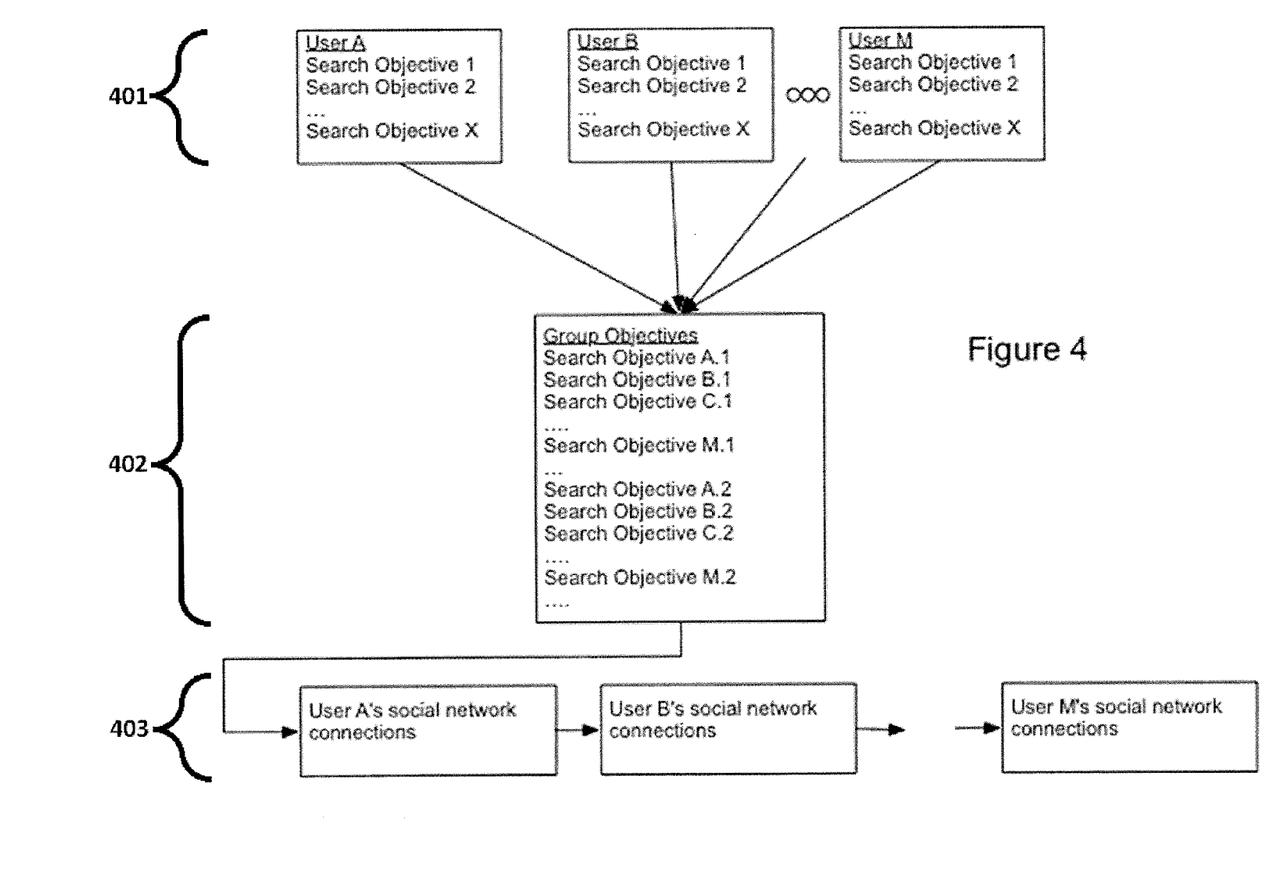
FIG. 4 is a flow chart illustrating an exemplary process of queuing search objectives in a system according to the invention.

FIG. 4 depicts a process for the prioritization and queuing of search objectives in the software application 210 according to some practices of the invention.

In block 401 of the illustrated embodiment, the search objectives for each member of the limited group (e.g., Users A, B, C, . . . , M) are ranked from most to least important independent of the search objectives of any other user. This can be based on metrics such as an amount of business at stake for the requesting user and/or a size of his or her accounts, a likelihood of finding a match for the objective within the social network 205, and so forth. The rankings may be "manually" adjusted, as well, e.g., by the user, administrator or others.

In block 402, the software application 210 aggregates the users' search objectives and maintains them as a ranked queue, such that each user's most important search objective is queried first, followed by each user's second most important search objective, etc.

In block 403, the software application 210 maintains an ordered queue reflecting those users of the limited group who are members of the online social network 205—or, put another way, a queue indicating an order in which those user-members respective links on the social network 205 are going to be searched in order to effect a collective search of the network 205 on behalf of all users (e.g., a search using user A's social network, a search using user B's social network, etc.).

In operation of the software application according to one practice of the invention, whenever a search for a given objective is found, the 403 search queue is terminated (vis-a-vis that objective) and is restarted for a next objective in identified in block 402. In such an embodiment, prioritization and queuing process is conducted with the principles of: (1) minimizing the variance in number of contacts found for each user in a limited time interval by resorting the queue identified in block 402; and (2) minimizing the variance in the number of contacts provided by each user in a limited time interval by resorting the queue effected in block 403. Thus, every time a match is found, the search objectives 402 are reordered to minimize the variance of principle (1). This is done, for example, by prioritizing search objectives pertaining to those users with the fewest matches already found. In addition, every time a match is found, the order of individual social networks 403 is reordered to minimize the variance of principle (2). This is done, for example, by prioritizing the social networks of users that have provided the fewest connections.

Described above are systems and methods meeting the aforementioned objects, among others. It will be appreciated that embodiments illustrated and described here are merely examples of the invention and that other embodiments incorporating changes thereto fall within the scope of the invention, of which we claim.

The invention claimed is:

1. A digital data processing system for searching and/or communicating on a social network, comprising:
   A. a server digital data processor that executes a social networking site that includes a plurality of members and that supports searching for and/or communicating with members based on degrees of connectedness therewith vis-a-vis the social networking site,
   B. where the social networking site includes an interface supporting such searching and/or communicating in response to requests on behalf of members,
   C. a client digital data processor including a processor coupled to a memory and programmed to provide collective search functionality that responds to a request from a first member by applying to the interface on behalf of a second member using login credentials of the second member an automated request to any of (i) search for one or more third members and (ii) to establish communications between the first member and one or more third members, where a degree of connectedness between the second and third members and between the first and third members is such that such search and/or communications would not be supported by the social networking site absent a request on behalf of the second member, said login credentials being stored in a repository of the client digital data processor,
   wherein the collective search functionality aggregates, prioritizes, and schedules any of search and communication requests from a plurality of members of a common group, the first and second members being members of the common group,
   wherein the collective search functionality generates a search queue that defines an order in which any of search and communication requests are applied to the interface on behalf of the common group, and
   wherein the collective search functionality prioritizes search and communication requests of members of the common group with the fewest matches already found and prioritizes searching within social networks of members of the common group that have provided the fewest matches.

2. The digital data processing system of claim 1, wherein the collective search functionality respects privacy settings of searched members of the social networking site.

3. The digital data processing system of claim 1, wherein the collective search functionality searches for the one or more third members by name, current or former company affiliation, and/or other criteria.

4. The digital data processing system of claim 1, wherein the first and third members are connected by second or higher degrees vis-a-vis the social networking site.

5. The digital data processing system of claim 4, wherein the first and second members are connected by a first degree vis-a-vis the social networking site.

6. The digital data processing system of claim 5, wherein said first degree connection is a direct connection and said second or higher degree connection is an indirect connection.

7. The digital data processing system of claim 1, wherein the collective search functionality responds to requests from one or more first members by applying to the interface on behalf of one or more second members one or more respective automated requests to any of (i) search for one or more third members and (ii) to establish communications between respective ones of the first members and respective ones of the third members, where a degree of connectedness between the respective second and third members and between the respective first and third members is such that such search and/or communications would not be supported by the social networking site absent respective requests on behalf of the respective second members.

8. The digital data processing system of claim 7, wherein the collective search functionality searches for the one or more third members by name, current or former company affiliation, and/or by other criteria.

9. The digital data processing system of claim 1, wherein members of that common group are connected by a first degree vis-a-vis the social networking site.

10. The digital data processing system of claim 1, wherein the respective first and third members are connected by second or higher degrees vis-a-vis the social networking site.

11. The digital data processing system of claim 1, wherein the collective search functionality generates the search queue so as to equally distribute search requests among group members.

12. A digital data processing system for searching a social network, comprising:
   A. a server digital data processor that executes a social networking site that includes a plurality of members and that supports searching for and/or communicating with members based on degrees of connectedness therewith vis-a-vis the social networking site,
   B. where the social networking site includes an interface providing such searching and communicating in response to automated requests on behalf of members,
   C. a store that contains one or more search objectives,
   D. a client digital data processor including a processor coupled to a memory and programmed to provide collective search functionality that is coupled to the store and that responds to a search objective by or on behalf of a first member by applying to the interface on behalf of a second member using login credentials of the second member an automated request to search for one or more third members, where a degree of connectedness between the second and third members and between the first and third members is such that a search would not be supported by the social networking site absent a request on behalf of the second member, said login credentials being stored in a repository of the client digital data processor, wherein the collective search functionality aggregates, prioritizes, and schedules search objectives from a plurality of members of a common group, the first and second members being members of the common group,
   wherein the collective search functionality generates a search queue that defines an order in which search objectives are applied to the interface on behalf of the common group, and
   wherein the collective search functionality prioritizes search objectives of members of the common group with the fewest matches already found and prioritizes searching within social networks of members of the common group that have provided the fewest matches.

13. The digital data processing system of claim 12, wherein the search objectives specify criteria of one or more third members of interest, where those criteria can include names, company affiliations, and/or other criteria.

14. The digital data processing system of claim 12, wherein the store maintains search objectives for the plurality of members of the common group.

15. The digital data processing system of claim 13, wherein the store maintains a plurality of search objectives for the common group.

16. The digital data processing system of claim 15, wherein the plurality of search objectives maintained by the store are generated from a customer relationship management system.

17. The digital data processing system of claim 15, wherein the plurality of search objectives maintained by the store are entered by one or more first members and/or by others.

18. The digital data processing system of claim 12, wherein the collective search functionality prioritizes the search objectives of the common group according to a prioritization that can be specified by one or more first and/or second members and/or by others.

19. The digital data processing system of claim 12, wherein the collective search functionality applies to the interface on behalf of the second member an automated request to establish communications between the first member and one or more third members identified in a result of a search objective, where a degree of connectedness between the respective second and those third members and between the respective first and third members is such that such communications would not be supported by the social networking site absent respective requests on behalf of the respective second members.

20. A method for searching and/or communicating with a social networking tool, the method being executed on one or more microprocessors coupled to memory, the method comprising:
   receiving and storing login credentials, each login credential corresponding to one of a plurality of users of the social networking tool and permitting said user to access their account with the social networking tool;
   receiving search objectives from one or more of said plurality of users;
   logging into the social networking tool using the stored login credentials for each of the plurality of users and executing the received search objectives on behalf of each of the plurality of users to generate a results list; and
   presenting the results list to the one or more of said plurality of users from which a search objective is received;
   wherein the received search objectives are aggregated, prioritized, and scheduled, wherein the received search objectives are queued in a search queue that defines an order in which the search objectives are executed on behalf of each of the plurality of users, and wherein search objectives of users with the fewest matches already found are prioritized and searches within social networks users that have provided the fewest matches are prioritized.

21. A digital data processing system for searching and/or communicating on a social network, comprising:

A. a server digital data processor that executes a social networking site that includes a plurality of members and that supports searching for and/or communicating with members based on degrees of connectedness therewith vis-a-vis the social networking site, B. where the social networking site includes an interface supporting such searching and/or communicating in response to requests on behalf of members, C. a client digital data processor including a processor coupled to a memory and programmed to provide collective search functionality that responds to a request from a first entity by applying to the interface on behalf of a second entity using login credentials of the second entity an automated request to any of (i) search for one or more third entities and (ii) to establish communications between the first entity and one or more third entities, where the second and the one or more third entities are members of the social networking site, and where a degree of connectedness between the second and third entities and between the first and third entities is such that such search and/or communications would not be supported by the social networking site absent a request on behalf of the second entity, said login credentials being stored in a repository of the client digital data processor, wherein the collective search functionality aggregates, prioritizes, and schedules any of search and communication requests from a plurality of members of a common group, the first and second entities being members of the common group, wherein the collective search functionality generates a search queue that defines an order in which any of search and communication requests are applied to the interface on behalf of the common group, and wherein the collective search functionality prioritizes search objectives and communication requests of members of the common group with the fewest matches already found and prioritizes searching within social networks of members of the common group that have provided the fewest matches.

22. A digital data processing system for searching and/or communicating on a social network, comprising:

a client digital data processor including a processor coupled to a memory and programmed to provide collective search functionality that responds to a request from a first member of a social networking site by applying to an interface to that social networking site on behalf of a second member using login credentials of the second member an automated request to any of (i) search for one or more third members and (ii) to establish communications between the first member and one or more third members, where a degree of connectedness between the second and third members and between the first and third members is such that such search and/or communications would not be supported by the social networking site absent a request on behalf of the second member, said login credentials being stored in a repository of the client digital data processor, where the social networking site supports searching for and/or communicating with members based on degrees of connectedness therewith vis-a-vis the social networking site, wherein the collective search functionality aggregates, prioritizes, and schedules any of search and communication requests from a plurality of members of a common group, the first and second members being members of the common group, wherein the collective search functionality generates a search queue that defines an order in which any of search and communication requests are applied to the interface on behalf of the common group, and wherein the collective search functionality prioritizes search objectives and communication requests of members of the common group with the fewest matches already found and prioritizes searching within social networks of members of the common group that have provided the fewest matches.

23. The digital data processing system of claim 22, wherein the collective search functionality respects privacy settings of searched members of the social networking site.

24. The digital data processing system of claim 22, wherein the collective search functionality searches for the one or more third members by name, current or former company affiliation, and/or other criteria.

25. The digital data processing system of claim 22, wherein the first and third members are connected by second or higher degrees vis-a-vis the social networking site.

26. A digital data processing system for searching a social network, comprising:

A. a store that contains one or more search objectives, and

B. a client digital data processor including a processor coupled to a memory and programmed to provide collective search functionality that is coupled to the store and that responds to a search objective by or on behalf of a first member of a social networking site by applying to an interface to that social networking site on behalf of a second member using login credentials of the second member an automated request to search for one or more third members, where a degree of connectedness between the second and third members and between the first and third members is such that a search would not be supported by the social networking site absent a request on behalf of the second member, said login credentials being stored in a repository of the client digital data processor, where the social networking site supports searching for and/or communicating with members based on degrees of connectedness therewith vis-a-vis the social networking site;

wherein the collective search functionality aggregates, prioritizes, and schedules search objectives from a plurality of members of a common group, the first and second members being members of the common group, wherein the collective search functionality generates a search queue that defines an order in which search objectives are applied to the interface on behalf of the common group, and wherein the collective search functionality prioritizes search objectives of members of the common group with the fewest matches already found and prioritizes searching within social networks of members of the common group that have provided the fewest matches.

27. The digital data processing system of claim 26, wherein the search objectives specify criteria of one or more third members of interest, where those criteria can include names, company affiliations, and/or other criteria.

* * * * *